United States Patent [19]

Palmer et al.

[11] Patent Number: 4,539,052

[45] Date of Patent: Sep. 3, 1985

[54] METHOD FOR MAKING A COMPOSITE CATHODE ACTIVE MATERIAL/CURRENT COLLECTOR PRODUCT

[75] Inventors: David N. Palmer, Tolland; Gary W. Ferrell, Collinsville, both of Conn.

[73] Assignee: Combustion Engineering, Inc., Windsor, Conn.

[21] Appl. No.: 600,355

[22] Filed: Apr. 16, 1984

Related U.S. Application Data

[63] Continuation-in-part of Ser. No. 464,069, Feb. 4, 1983, abandoned.

[51] Int. Cl.$^3$ .............................................. B05D 5/12
[52] U.S. Cl. .................................. 148/6.24; 148/6.30; 427/120; 427/126.1; 427/255.4; 429/218
[58] Field of Search ........................... 148/6.24, 6.30; 429/218; 427/120, 126.1, 255.4

[56] References Cited

U.S. PATENT DOCUMENTS

| | | | |
|---|---|---|---|
| 2,707,159 | 4/1955 | Foucry et al. | 148/6.24 |
| 2,747,007 | 5/1956 | Brandt | 429/209 |
| 3,629,012 | 12/1971 | Kohn | 148/6.24 |
| 3,864,167 | 2/1975 | Broadhead et al. | 429/218 |
| 3,980,761 | 9/1976 | Thompson et al. | 429/218 |
| 4,009,052 | 2/1977 | Whittingham | 429/218 |

*Primary Examiner*—Richard Bueker
*Attorney, Agent, or Firm*—Brumbaugh, Graves, Donohue & Raymond

[57] ABSTRACT

A composite cathode active material/current collector product useable as a component of a cathode for secondary batteries without the need for a separate current collector, which comprises a wire having a conductive interior portion of a transition metal and an exterior portion of an intercalatable layered transition metal chalcogenide, is made by a method which involves reacting a transition metal wire with a vapor of a chalcogen or a hydrogen chalcogenide.

9 Claims, No Drawings

METHOD FOR MAKING A COMPOSITE CATHODE ACTIVE MATERIAL/CURRENT COLLECTOR PRODUCT

This application is a continuation-in-part application of U.S. patent application Ser. No. 464,069, filed Feb. 4, 1983, now abandoned.

The present invention relates to a method for making a composite cathode active material/current collector product, the product so obtained and cathodes comprising the product.

Intercalatable layered transition metal chalcogenides, such as titanium disulfide and titanium trisulfide, are well known to be useful as the cathode active material for lithium nonaqueous secondary batteries which operate upon the principle of intercalation. Typical examples of such materials and such batteries are those disclosed, for example, in U.S. Pat. Nos. 4,009,052; 4,049,879; 4,049,887; 4,198,476; 4,206,276; 4,207,245; 4,228,226; and 4,233,377.

A number of methods have been proposed heretofore for the preparation of intercalatable layered transition metal chalcogenides, and in particular titanium disulfide, as discussed below.

According to U.S. Pat. No. 4,203,861, titanium disulfide can be prepared by the vapor phase reaction between titanium tetrachloride and hydrogen sulfide. However, this method results in the production of titanium disulfide particles having an average largest diameter of only 2-16 microns.

U.S. Pat. Nos. 4,007,055 and 4,084,046 disclose a method for preparing titanium disulfide by heating particulate metallic titanium feed material, namely, titanium sponge having a small particle size distribution ranging between about 100% minus 4 mesh and 100% plus 40 mesh, to a reaction temperature between 475° C. and 600° C., contacting the heated titanium with an atmosphere having a sulfur partial pressure substantially equal to the equilibrium sulfur partial pressure at the reaction temperature to form titanium disulfide and maintaining the reactants at the reaction temperature sufficiently to insure complete reaction. However, this method also results in the production of titanium disulfide in fine powder form.

U.S. Pat. No. 3,980,761 also discloses a method for preparing titanium disulfide wherein titanium metal feed material, such as titanium sponge or titanium wire, is reacted with less than stoichiometric amounts of elemental sulfur at a temperature between about 400° C. and 1000° C. to form titanium-rich titanium disulfide which is then annealed at a temperature between about 400° C. and 600° C. in an atmosphere having a sulfur partial pressure approximately equal to the sulfur partial pressure of the stoichiometric titanium disulfide. However, this method once again produces titanium disulfide in finely divided powder form having a particle size distribution of about 100% less than about 2 microns and 100% greater than about 0.1 micron.

In view of the fact that these known methods produce titanium disulfide in finely divided powdered form, such material can only be used as the cathode active material in cathodes when employed in conjunction with a current collector.

The objects of the present invention are to provide a method for making a composite cathode active material/current collector product, the resulting product and a cathode comprising that product so that the product can be used in a cathode without the need for a separate current collector.

Accordingly, the present invention provides a method for making a composite cathode active material/current collector product which comprises the following steps:

(a) heating a transition metal wire having a minimum diameter of 0.1 cm under a vacuum of about $1 \times 10^{-6}$ torr and then contacting the wire with an approximately stoichiometric amount of a vapor of a chalcogen or of a vapor of a hydrogen chalcogenide at a temperature of from about 500° C. to about 1000° C. and at a vapor pressure of from about 0.3 atmosphere to about 3 atmospheres for from about 4 hours to about 63 hours;

(b) removing any unreacted vapor;

(c) cooling the wire to room temperature;

(d) packing the wire with excess chalcogen and providing a vacuum of $1 \times 10^{-6}$ torr around the packed wire;

(e) raising the temperature of the packed wire at a rate of about 10° C.–25° C. per minute to a temperature of from about 450° C. to about 1000° C. and holding said temperature for from about 8 hours to about 48 hours; and (f) cooling the wire to room temperature under its own thermal inertia;

whereby there is formed a wire having a conductive interior portion of a transition metal capable of serving as a current collector and having an exterior portion of an intercalatable layered transition metal chalcogenide extending inwardly toward the interior portion over a distance of from about 10% to about 45% of the wire diameter capable of serving as a cathode-active material.

Steps (d), (e) and (f) can be repeated to produce a higher transition metal chalcogenide layer on the wire.

The composite cathode active material/current collector product of the present invention produced by the above-described method is a wire having a conductive interior portion of a transition metal capable of serving as a current collector and having an exterior portion of an intercalatable layered transition metal chalcogenide extending inwardly toward the interior portion over a distance of from about 10% to about 45% of the wire diameter capable of serving as a cathode active material.

The product of the present invention, due to its dual capacity, can be used as a component of a cathode for lithium nonaqueous secondary batteries without the need for a separate current collector.

Suitable transition metals for use in the present invention are the metals of Groups 1b to 7b and 8 and include for example, titanium, vanadium, tantalum, chromium, cobalt, nickel, manganese, niobium, ruthenium, molybdenum, hafnium, zirconium and tungsten. The preferred transition metals are titanium and niobium.

Suitable chalcogens and hydrogen chalcogenides for use in the present invention include, for example, oxygen, sulfur, selenium, and tellurium; and hydrogen selenide and hydrogen telluride. The preferred chalcogens are sulfur and selenium and the preferred hydrogen chalcogenide is hydrogen selenide.

The transition metal wire feed material and the wire product can be in the form of continuous wires or continuous filaments, including screens or grids, as well as in the form of discontinuous filaments or fibers, including compacts or mats.

The wire product can be used as a component of a cathode without the need for a separate current collector by compacting or matting the wire in fibrous form in conjunction with an appropriate binding agent, such as polyethylene, or by knitting, weaving or working the wire in continuous filament form into a screen or grid shape, and removing the transition metal chalcogenide from convenient ends of the wire surface to form electrical leads.

The invention will be further illustrated by the representative examples thereof set forth below. In each of these examples the following preliminary procedure is performed first:

(a) Charge a predetermined or convenient weight of a transition metal wire having a minimum diameter of 0.1 cm into a quartz reactor of suitable volume and evacuate the system to $1 \times 10^{-6}$ torr at 22° C.–25° C. and hold at that condition for at least 2 hours.

(b) Backfill a mixture of 90% He and 10% $H_2$ (<1 ppm $H_2O/O_2$) into the quartz reactor containing the transition metal wire to a pressure of 1 atmosphere. Seal the reactor to atmosphere and heat its contents at 10° C./minute to 500° C. Hold the reactor and its contents at 500° C. for 8 hours to 24 hours.

(c) After this period evacuate the reactor to $1 \times 10^{-6}$ torr at 22° C.–25° C. for at least 2 hours.

(d) Connect the quartz reactor and wire contents in a suitable fashion to another quartz reactor of suitable volume which contains high purity chalcogen or hydrogen chalcogenide and which has also been evacuated to $1 \times 10^{-6}$ torr.

EXAMPLE 1 ($TiS_2$+Ti Core)

4.5 g. (0.094 moles) of a titanium wire having a diameter of 0.1 cm and a length of 127 cm is heated to 525° C. 6.5 g. (0.2 moles) of sulfur at 375° C. is evaporated over to the titanium wire section of the reactor creating an equilibrium sulfur vapor pressure over the titanium wire of 0.3 atmosphere (or 3 atmospheres) at 525° C. The titanium wire is held at 525° C. for 40 hours (or 6.5 hours) to convert 40% of the titanium wire diameter to $TiS_{1.98}$ with a diameterical conversion rate of $1.38 \times 10^{-7}$ cm/sec (or $8.55 \times 10^{-7}$ cm/sec).

After the 40 hour conversion is completed, the reactor containing the 40% converted titanium wire is evacuated at 525° C. to $1 \times 10^{-6}$ torr for 2 hours minimum to remove excess unreacted sulfur vapor and then the titanium wire is cooled to room temperature (22° C.–25° C.).

The 40% converted titanium wire is packed with excess sulfur and the reactor evacuated to $1 \times 10^{-6}$ torr and heated at 25° C./minute to 500° C. and held for 8 hours at this condition. The $TiS_{1.98}$ converted layer on the titanium wire will convert further to $TiS_{2.00}$.

After the 8 hour thermal post treatment period is completed, the titanium wire in the reactor is cooled to 25° C. under its own thermal inertia.

Convenient ends of the wire are scraped free of $TiS_2$ for ohmic contact to an external circuit. Powder scraped from the ends was found to have a volume resistivity of better than <0.10 ohm-cm and a composition of $TiS_{2.00\pm0.01}$.

EXAMPLE 2 ($NbSe_x$+Nb Core)

Part 2A—Production of Niobium Diselenide Layer 4.5 g. (0.05 moles) of a niobium wire having a diameter of 0.1 cm and a length of 68.5 cm is heated to 752° C. (for selenium) or 749° C. (for hydrogen selenide). 7.6 g. (0.1 moles) of selenium (at 686° C.) or 0.3 atmosphere of hydrogen selenide (at 749° C.) is allowed to react with the niobium wire in the reaction zone of the reactor to create a 0.3 atmosphere of selenium or hydrogen selenide vapor in equilibrium with the wire at the previously indicated temperature. The niobium wire is held at 752° C. (for selenium) or at 749° C. (for hydrogen selenide) for 52 hours in the case of selenium vapor or 23 hours in the case of hydrogen selenide vapor for 40% conversion of the niobium wire diameter to $NbSe_{1.98}$.

After either of the above-prescribed conversion time, the 40% converted niobium wire reactor zone is evacuated to $1 \times 10^{-6}$ torr at 752° C. or 749° C. for 2 hours minimum to remove excess unreacted vapor and then the niobium wire is cooled to room temperature.

The 40% converted niobium wire is packed with excess selenium and the reactor evacuated to $1 \times 10^{-6}$ torr and heated at 25° C./minute to 752° C. and held for 8–10 hours at this condition. The $NbSe_{1.98}$ converted layer on the niobium wire will convert further to $NbSe_{2.07\pm0.03}$.

After the 8–10 hour thermal post treatment period is completed, the niobium wire in the reactor is cooled to 25° C. under its own thermal inertia.

Part 2B—Production of Niobium Tetraselenide Layer

To further convert the $NbSe_{2.07}$ layer to a $NbSe_{4.33}$ layer, the above $NbSe_{2.07}$ layered niobium wire is again packed with excess selenium, the reactor evacuated as above, heated at 10° C./minute to 450° C., held for 8–26 hours at this condition and the wire in the reactor cooled to room temperature under its own thermal inertia.

Part 2C—Production of Niobium Triselenide Layer 4.5 g. (0.05 moles) of a niobium wire having a diameter of 0.1 cm and a length of 68.5 cm is heated to 690° C. (for selenium) or 679° C. (for hydrogen selenide). 11.6 g. (0.15 moles) of selenium (at 685° C.) or 0.3 atmosphere of hydrogen selenide (at 690° C.) is allowed to react with the niobium wire in the reaction zone of the reactor to create a 0.3 atmosphere of selenium or hydrogen selenide vapor in equilibrium with the wire at the previously indicated temperature. The niobium wire is held at 690° C. (for selenium) or at 679° C. (for hydrogen selenide) for 63 hours in the case of selenium vapor or 25 hours in the case of hydrogen selenide vapor for 40% conversion of the niobium wire diameter to $NbSe_{2.86}$.

After either of the above prescribed conversion time, the 40% converted niobium wire reactor zone is evacuated to $1 \times 10^{-6}$ torr at 690° C. or at 679° C. for 2 hours minimum to remove excess unreacted vapor and then the niobium wire is cooled to 23° C.

The 40% converted niobium wire is packed with excess selenium and the reactor evacuated to $1 \times 10^{-6}$ torr and heated at 25° C./minute to 752° C. and held for 7–11 hours at this condition. The $NbSe_{2.86}$ converted layer on the niobium wire will convert further to $NbSe_{3.01\pm0.02}$.

After the 7–11 hour thermal post treatment period is completed, the niobium wire in the reactor is cooled to 25° C. under its own thermal inertia.

Part 2D—Production of Niobium Tetraselenide Layer

To further convert the $NbSe_{3.01}$ layer to a $NbSe_{4.33}$ layer, the above $NbSe_{3.01}$ layered niobium wire is again packed with excess selenium, the reactor evacuated as above, heated at 10° C./minute to 450° C., held for 8-30 hours at this condition and the wire in the reactor cooled to room temperature under its own thermal inertia.

Data concerning Example 2 (Parts 2A, 2C and 2D) are set forth in Table II below.

TABLE II

| Example 2 Part | Compounds and Conditions | | | | | | | |
|---|---|---|---|---|---|---|---|---|
| | Nb Zone Reactor T °C. | | Chalcogen Zone Reactor T °C. | | Time for 40% Conversion (hrs.) | | Diametrical Conversion Rate (cm/sec) | |
| | Se | $H_2Se$ | Se | $H_2Se$ | Se | $H_2Se$ | Se | $H_2Se$ |
| 2A - $NbSe_2$ | 752° | 749° | 686° | 200° | 52 | 23 | $1.07 \times 10^{-7}$ | $2.42 \times 10^{-7}$ |
| | Nb wt (gms) | | Se wt (gms) | $H_2Se$ pressure | | | | |
| | 4.5 | | 7.6 | 0.3 atmospheres at 749° C. | | | | |
| 2C - $NbSe_3$ | 690° | 679° | 685° | 200° | 63 | 25 | $8.82 \times 10^{-8}$ | $2.22 \times 10^{-7}$ |
| | Nb wt (gms) | | Se wt (gms) | $H_2Se$ pressure | | | | |
| | 4.5 | | 11.6 | 0.3 atmospheres at 690° C. | | | | |

| | Characteristics of Layers Produced | |
|---|---|---|
| | Stoichiometry | Volume Resistivity (ohm-cm) |
| 2A - $NbSe_2$ | $NbSe_{2.07 \pm 0.03}$ | 157 |
| 2C - $NbSe_3$ | $NbSe_{3.01 \pm 0.02}$ | 0.06 |
| 2D - $NbSe_4$ | $NbSe_{4.33 \pm 0.11}$ | 22 |

The method of the invention may be used on plated, vapor deposited, or calorized wires where a surface plate of transition metal is to be converted to a suitable layered compound. Alloyed wires with active metal can also be used.

It will be apparent to those skilled in the art that the reaction times can be greatly reduced if the quartz reactor is placed in a compensating autoclave to increase the vapor pressure.

What is claimed is:

1. A method for making a composite cathode active material/current collector product which comprises the following steps:
    (a) heating a transition metal wire having a minimum diameter of 0.1 cm under a vacuum of about $1 \times 10^{-6}$ torr and then contacting the wire with an approximately stoichiometric amount of a vapor of a chalcogen or of a vapor of a hydrogen chalcogenide at a temperature of from about 500° C. to about 1000° C. and at a vapor pressure of from about 0.3 atmosphere to about 3 atmospheres for from about 4 hours to about 63 hours;
    (b) removing any unreacted vapor;
    (c) cooling the wire to room temperature;
    (d) packing the wire with excess chalcogen and providing a vacuum of about $1 \times 10^{-6}$ torr around the packed wire;
    (e) raising the temperature of the packed wire at a rate of about 10°-25° C. per minute to a temperature of from about 450° C. to about 1000° C. and holding said temperature for from about 8 hours to about 48 hours; and
    (f) cooling the wire to room temperature under its own thermal inertia;

whereby there is formed a wire having a conductive interior portion of a transition metal capable of serving as a current collector and having an exterior portion of an intercalatable layered transition metal chalcogenide extending inwardly toward the interior portion over a distance of from about 10% to about 45% of the wire diameter capable of serving as a cathode active material.

2. A method according to claim 1 wherein steps (d), (e) and (f) are repeated.

3. A method according to claim 1 wherein the transition metal is titanium, the chalcogen is sulfur and the intercalatable layered transition metal chalcogenide is titanium disulfide.

4. A method according to claim 1 wherein the transition metal is niobium, the chalcogen is selenium and the intercalatable layered transition metal chalcogenide is niobium diselenide.

5. A method according to claim 1 wherein the transition metal is niobium, the hydrogen chalcogenide is hydrogen selenide, the chalcogen is selenium and the intercalatable layered transition metal chalcogenide is niobium diselenide.

6. A method according to claim 2 wherein the transition metal is niobium, the chalcogen is selenium and the intercalatable layered transition metal chalcogenide is niobium tetraselenide.

7. A method according to claim 2 wherein the transition metal is niobium, the hydrogen chalcogenide is hydrogen selenide, the chalcogen is selenium and the intercalatable layered transition metal chalcogenide is niobium tetraselenide.

8. A method according to claim 1 wherein the transition metal is niobium, the chalcogen is selenium and the intercalatable layered transition metal chalcogenide is niobium triselenide.

9. A method according to claim 1 wherein the transition metal is niobium, the hydrogen chalcogenide is hydrogen selenide, the chalcogen is selenium and the intercalatable layered transition metal chalcogenide is niobium triselenide.

* * * * *